(12) United States Patent
Laugt

(10) Patent No.: US 6,467,730 B2
(45) Date of Patent: Oct. 22, 2002

(54) AIRCRAFT AIRFOIL LEADING EDGE MEMBER EQUIPPED WITH A DE-ICING DEVICE

(75) Inventor: Paul Laugt, Martignas (FR)

(73) Assignee: Dassault Aviation, Paris (FR)

( * ) Notice: Subject to any disclaimer, the term of this patent is extended or adjusted under 35 U.S.C. 154(b) by 0 days.

(21) Appl. No.: 09/760,715

(22) Filed: Jan. 17, 2001

(65) Prior Publication Data

US 2001/0023909 A1 Sep. 27, 2001

(30) Foreign Application Priority Data

Jan. 17, 2000 (FR) .......................................... 00 00525

(51) Int. Cl.⁷ ............................................. B64D 15/04
(52) U.S. Cl. ...................... 244/134 B; 244/57; 244/123
(58) Field of Search ........................ 244/134 R, 134 B, 244/134 C, 207, 208, 209, 57

(56) References Cited

U.S. PATENT DOCUMENTS

| 2,320,870 | A | * | 6/1943 | Johnson ................... 244/134 R |
| 2,470,128 | A | * | 5/1949 | Barrick et al. .......... 244/134 R |
| 2,556,736 | A | * | 6/1951 | Palmatier ................ 244/134 A |
| 2,581,760 | A | * | 1/1952 | Harpoothian et al. ... 244/134 R |
| 4,099,691 | A | * | 7/1978 | Swanson et al. ........ 244/134 R |
| 4,615,499 | A |   | 10/1986 | Knowler |
| 4,741,499 | A |   | 5/1988 | Rudolph et al. |
| 5,011,098 | A | * | 4/1991 | McLaren et al. ....... 244/134 B |
| 5,088,277 | A | * | 2/1992 | Schulze .................. 244/134 R |
| 5,807,454 | A | * | 9/1998 | Kawabe et al. ......... 244/134 B |

FOREIGN PATENT DOCUMENTS

| EP | 0 230 684 | 8/1987 | |
| GB | 1032681 | * 6/1966 | ............. 244/134 B |

* cited by examiner

Primary Examiner—Galen L. Barefoot
(74) Attorney, Agent, or Firm—Jacobson Holman PLLC

(57) ABSTRACT

A leading edge member of an airfoil of an aircraft has an outside wall defining a wing span and a deicing device for circulating hot air in the direction of the wing span of the airfoil. The device includes a hot air distribution duct extending inside the leading edge member in the direction of the span of the foil. The duct has a plurality of orifices distributed over at least part of its length. A hot air supply communicates with one end of the distribution duct. The hot air supply is connected by ducts located outside the leading edge member to at least one propulsion engine of the aircraft.

20 Claims, 2 Drawing Sheets

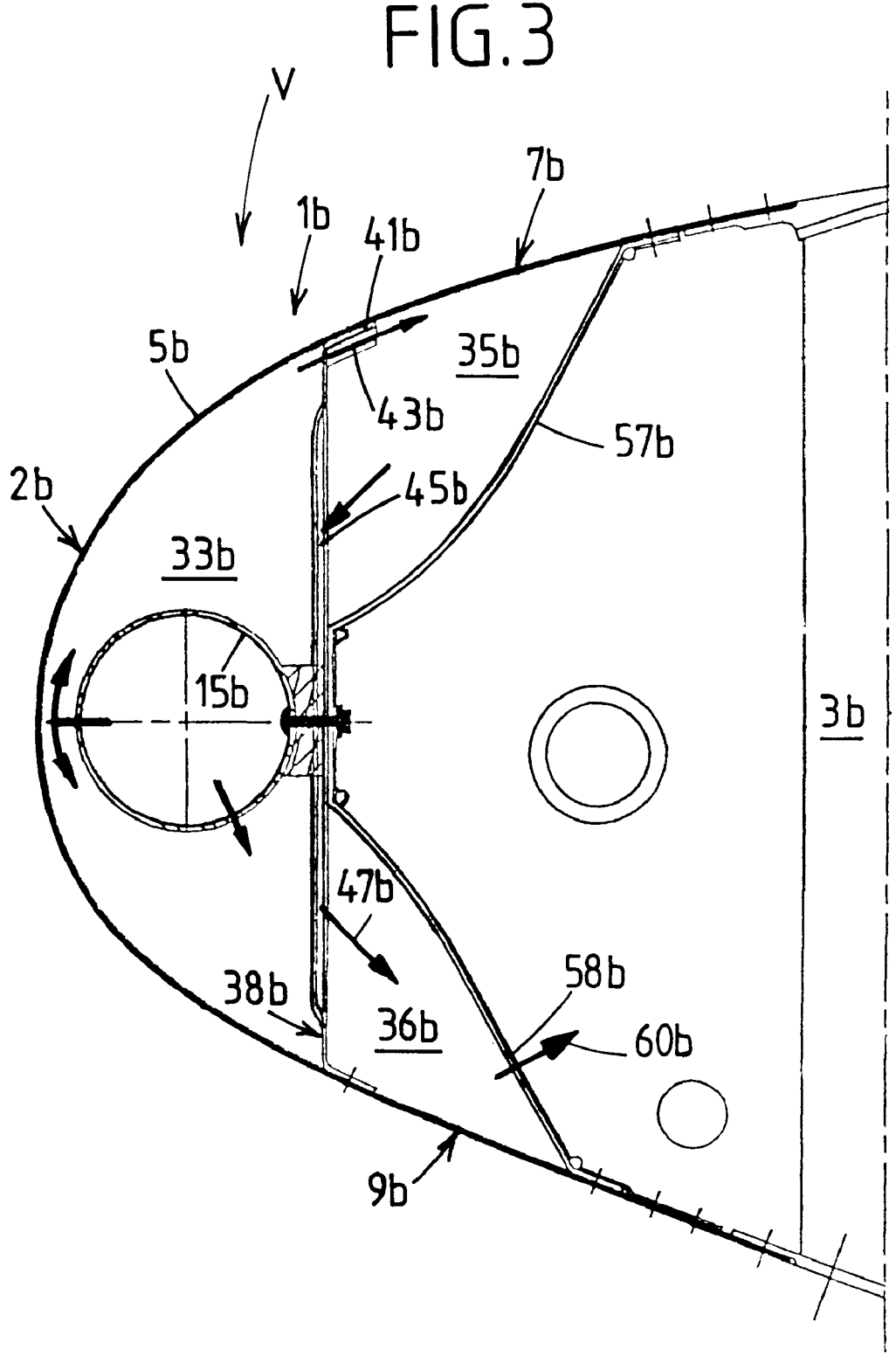

AIRCRAFT AIRFOIL LEADING EDGE MEMBER EQUIPPED WITH A DE-ICING DEVICE

BACKGROUND OF THE INVENTION

1. Field of the Invention

The present invention relates to an aircraft airfoil leading edge member equipped with a de-icing device, to an airfoil equipped with that leading edge member, and to an aircraft equipped with that airfoil.

The expression "airfoil leading edge member" refers to a fixed or mobile member forming at least part of the leading edge of the airfoil.

2. Description of the Prior Art

U.S. Pat. No. 4,741,499 to Rudolph et al., discloses an airfoil leading edge member having an outside wall and a de-icing device of the type for circulating hot air in the direction of the span of the airfoil. The device includes a) a hot air distribution duct extending inside the leading edge member in the span direction and has a plurality of orifices distributed over at least part of its length, and b) hot air supply means communicating with one end of the distribution duct.

The above prior art system combats the formation of ice on an airfoil leading edge member in a relatively effective manner.

However, in the above prior art system, the hot air supply means include a heating unit and a blower located inside the airfoil leading edge member for heating and circulating the hot air in a closed circuit inside the airfoil leading edge member.

In the above system energy from the propulsion engines of the aircraft must be converted into electrical energy to supply the heating units and the blowers and that electrical energy must then be converted into heat energy. In the final analysis there is therefore a great loss of energy which adversely affects the fuel consumption of the aircraft.

An object of the present invention is to eliminate the drawbacks mentioned above.

This together with other objects and advantages which will become subsequently apparent reside in the details of construction and operation as more fully hereinafter described and claimed, reference being had to the accompanying drawings forming a part hereof, wherein like numerals refer to like parts throughout.

SUMMARY OF THE INVENTION

This object of the invention is achieved with a leading edge member of an aircraft airfoil having an outside wall and a de-icing device of the type for circulating hot air in the direction of the span of said airfoil, said device including a) a hot air distribution duct extending inside said leading edge member in said direction and having a plurality of orifices distributed over at least part of its length, and b) hot air supply means communicating with one end of said distribution duct, characterized in that said hot air supply means are adapted to be connected by at least one duct located outside said leading edge member to at least one propulsion engine of said aircraft.

Because of the above features, hot air coming directly from the engines of the aircraft can be used for de-icing, which avoids the energy losses inherent to the prior art system.

The present invention also provides:

an aircraft airfoil that is noteworthy in that it includes a leading edge member as defined above, and an aircraft that is noteworthy in that it includes an airfoil as defined above.

BRIEF DESCRIPTION OF THE DRAWINGS

Other features and advantages of the present invention will become apparent on reading the following description and examining the accompanying drawings, in which:

FIG. 3 is a view in cross section of a fixed airfoil leading edge member according to the invention.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
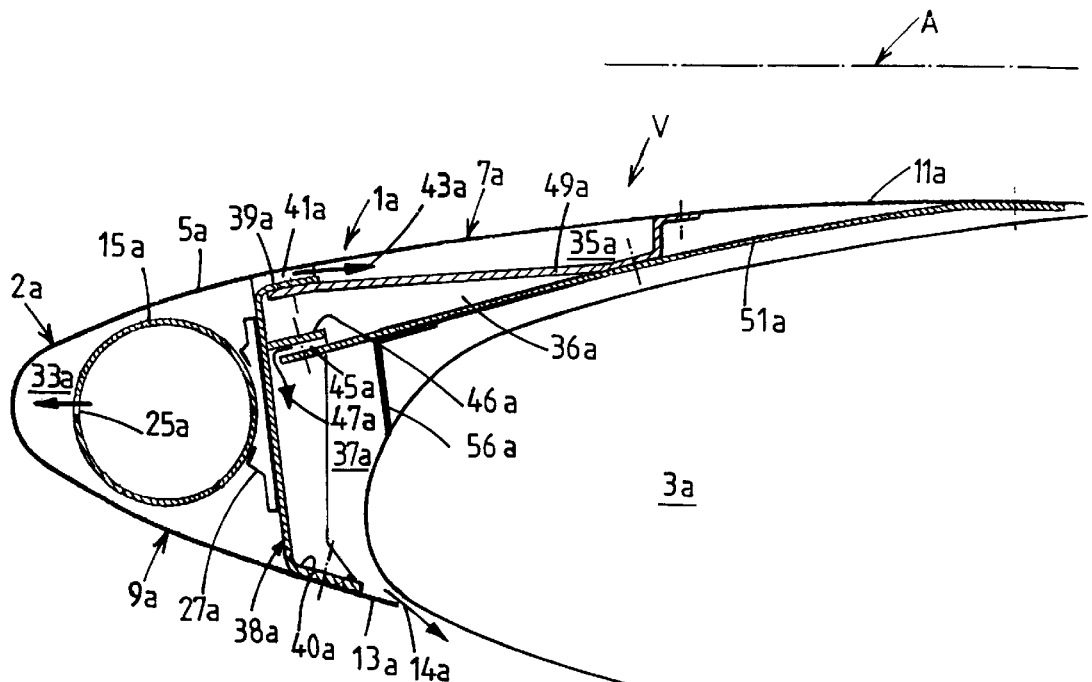
FIG. 1 is a view in cross section of a mobile airfoil leading edge member according to the invention.
Figure 2:
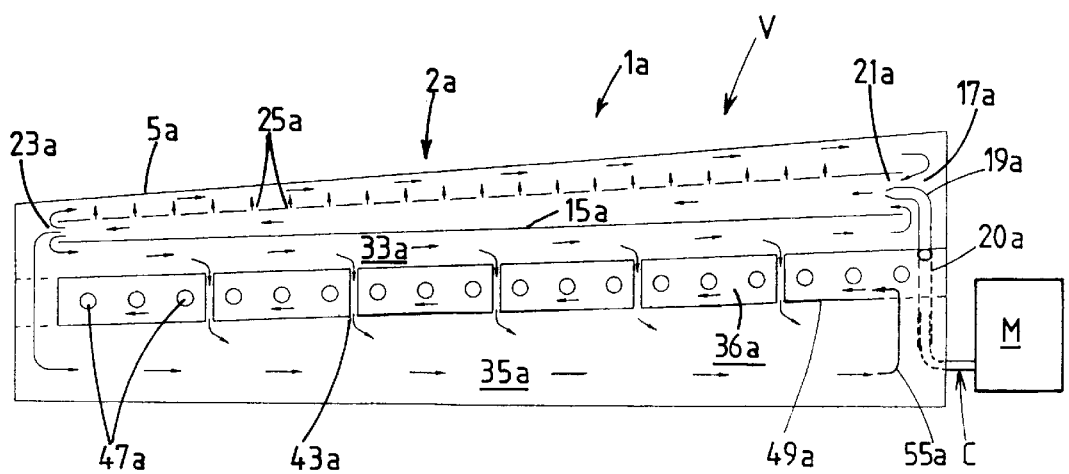
FIG. 2 is a plan view of the mobile airfoil leading edge member from FIG. 1 with the wall part forming the top surface of the leading edge member removed.

In FIGS. 1 and 2 the reference numbers bear the suffix a; in FIG. 3 they bear the suffix b.

Identical reference numbers designate identical or similar units or sets of units.

In the following description, the terms "upper", "lower", "above" and "below" must be understood as referring to the top and bottom edges of the appended drawing sheets being vertically at the top and at the bottom, respectively.

FIGS. 1 and 2 show a mobile leading edge member $1a$ according to the invention forming part of a leading edge $2a$ of an airfoil V of an aircraft A.

The term "mobile" signifies that the leading edge member can slide on rails (not shown) to a position away from the fixed part of the airfoil $3a$ to increase the lift of the aircraft, especially during landing.

The mobile leading edge member $1a$ is formed by a single outside wall $5a$ defining a top surface $7a$, a bottom surface $9a$ and a tail $11a$.

The end $13a$ of the bottom surface $9a$ and the fixed part of the airfoil $3a$ have a clearance $14a$ between them.

Inside the leading edge member $1a$ is a de-icing device including a hot air distribution duct $15a$ extending along the direction of the leading edge member $1a$, i.e. in the direction of the span of the airfoil V.

As can be seen in FIG. 2, hot air supply means can include an injector $19a$ and a telescopic tube part $20a$ communicating with one end $17a$ of the duct $15a$.

According to one essential feature of the invention, the hot air supply means are adapted to be connected by at least one duct C outside the leading edge member $1a$ to at least one propulsion engine M of the aircraft A.

The injector $19a$ forms a passage $21a$ with the duct $15a$. The other end $23a$ of the duct $15a$ is open.

The duct $15a$ has orifices $25a$ distributed over at least part of its length, preferably over its entire length. The orifices preferably face the leading edge $2a$ (see FIGS. 1 and 2).

The end 17a of the duct 15a is preferably fixed to the structure of the leading edge member and the rest of its length is held in position by slides 27a (see FIG. 1).

As can be seen in FIGS. 1 and 2, the mobile leading edge member 1a includes a first compartment 33a on the inside of the leading edge member 2a and containing the distribution duct 15a, a second compartment 35a located under the top surface 7a, a third compartment 36a located substantially between the first and second compartments 33a and 35a, and a fourth compartment 37a located substantially between the first compartment 33a and the fixed part 3a of the airfoil.

The compartments are formed by:

a spar 38a whose section is substantially E-shaped with the top and bottom parts 39a and 40a respectively fixed to the top surface 7a and the bottom surface 9a, having first embossing 41a formed on the top part 39a of the E and defining hot air passages 43a between the first and second compartments 33a and 35a and second embossing 45a formed on the median part 46a of the E and defining hot air passages 47a between the third and fourth compartments 36a and 37a, an outside section 49a fixed to the top part 39a of the E and to the top surface 7a of the leading edge member 1a, and an inside section 51a fixed to the median part 46a of the E and to the outside section 49a and to the top surface 7a of the leading edge member 1a.

As can be seen in FIG. 2, the outside section 49a has hot air passages 55a (formed by grooves or orifices, for example) in the vicinity of the injector 19a between the second and third compartments 35a and 36a.

An insulating seal 56a is placed between the inside section 51a and the fixed airfoil part 3a.

FIG. 3 shows a leading edge member 1b fixed to the fixed airfoil part 3b.

As can be seen in the figure, the fixed leading edge member 1b differs from the mobile leading edge member 1a essentially in that the compartments in the latter are a different shape.

The fixed leading edge member includes a first compartment 33b inside the leading edge 2b and containing the distribution duct 15b, a second compartment 35b located under the top surface 7b, and a third compartment 36b located above the bottom surface 9b.

The above compartments are formed by:

a spar 38b whose section is substantially C-shaped fixed to the inside of the leading edge member, having first embossing 41b forming hot air passages 43b between the first and second compartments 33b and 35b and second embossing 45b forming hot air passages 47b between the second and third compartments 35b and 36b, and sections 57b fixed to the C-shaped spar 38b, to the top surface 7b and to the bottom surface 9b of the leading edge member 1b.

The outside wall 5b includes, in the bottom part of sections 57b, orifices 58b defining hot air passages 60b between the third compartments 36b and a box section (not shown) for channeling the hot air to the vicinity of the fuselage.

As in the case of the mobile leading edge member 1a, the hot air supply means can include an injector (not shown) communicating with one end of the duct 15b.

The injector is adapted to be connected by at least one duct to at least one propulsion engine of the aircraft.

Because the leading edge member 1b is fixed, it is not necessary to provide any telescopic tube part.

The operation and the advantages of the airfoil leading edge member according to the invention follow directly from the preceding description.

The path followed by the hot air is indicated by arrows in FIGS. 1 to 3.

In the case of the mobile leading edge member 1a (see FIG. 2), the hot air from the propulsion engine M reaches the duct 15a via the duct C, the telescopic tube part 20a and the injector 19a.

The hot air then leaves the duct 15a in the first compartment 33a via the open end 23a and via the orifices 25a and flows in contact with the outside wall 5a, which de-ices the leading edge 2a of the leading edge member 1a.

The hot air can then either flow back inside the distribution duct 1 5a through the passage 21a or flow into the second compartment 35a via the passages 43a (see FIGS. 1 and 2).

In the latter case the hot air deices the top surface 7a of the leading edge member 1a as it flows directly along the wall 2a.

It then returns to the third compartment 36a via the passages 55a at the end of the leading edge member (see FIG. 2) and then passes through the passages 47a (see FIG. 1) to return to the fourth compartment 37a and finally to escape to the outside through the clearance 14a.

In the case of the fixed leading edge member 1b (see FIG. 3), the path followed by the hot air is substantially the same: after reaching the second compartment 35b via the passages 43b, the hot air returns to the third compartment 36b through the passages 47b and then passes through the passages 60b before it returns to the box section (not shown) which conveys the air to the vicinity of the fuselage.

As will now be clear, the airfoil leading edge member according to the invention enables direct use of hot air from the engines of the aircraft for de-icing, which avoids the energy losses inherent to the prior art system, and so reduces the additional consumption of fuel for de-icing purposes.

Of course, the present invention is not limited to the embodiments described as shown, which are provided by way of illustrative and non-limiting examples, and the foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A leading edge member of an airfoil of an aircraft having an outside wall and a de-icing device for circulating hot air in a direction of a span of said airfoil, said de-icing device comprising a hot air distribution duct extending longitudinally inside said leading edge member in said direction of said span and spaced from said outside wall, said distribution duct having two open ends defining a length of said duct with a plurality of orifices distributed over at least a part of said length between said two ends and, a hot air supply duct communicating with one of said ends of said distribution duct for hot air flow through said distribution duct and longitudinally along said outside wall, said hot air supply duct connected to at least one propulsion engine of said aircraft.

2. The leading edge member of an airfoil according to claim 1, wherein said hot air supply duct includes a hot air injector discharging into an interior at said one end of said distribution duct and defining a passage therewith.

3. The leading edge member of an airfoil according to claim 1, wherein the other end of said distribution duct is open.

4. The leading edge member of an airfoil according to claim 1, wherein said distribution duct is fixed at said one end to a structure of said leading edge member and said distribution duct is held in position over the remainder of its length by slide means.

5. The leading edge member of an airfoil according to claim 1, comprising:
   a first compartment inside the leading edge of said leading edge member and containing said distribution duct for de-icing said leading edge,
   a second compartment located under a top surface of said leading edge member, for de-icing said top surface,
   a third compartment for collecting said hot air, and
   said first and second compartments communicating with each other, and said second and third compartments communicating with each other.

6. The leading edge member of an airfoil according to claim 5, wherein said leading edge member is mobile, said hot air supply duct includes a telescopic tube part, and said third compartment is located substantially between said first compartment and said second compartment.

7. The leading edge member of an airfoil according to claim 6, wherein said leading edge member further includes a fourth compartment located substantially between said first compartment and a fixed part of said airfoil and communicating with the outside, and
   a substantially E-shaped spar fixed to the inside of said leading edge member, said E-shaped spar forming said first compartment, second compartment, third compartment and fourth compartment, and having first hot air passages between the first compartment and the second compartment and second hot air passages between said third compartment and said fourth compartment,
   an outside section fixed to a top part of said E-shaped spar and to the top surface of said leading edge member, having third hot air passages between said second compartment and said third compartment, and
   an inside section fixed to a median part of said E-shaped spar and to said outside section and to the top surface of the leading edge member.

8. The leading edge member of an airfoil according to claim 7, wherein said first passages are established by first embossing on the top part of said E-shaped spar, said second passages are established by second embossing on the median part of said E-shaped spar, and said third passages are established by grooves or orifices on said outside section.

9. The leading edge member of an airfoil according to claim 5, wherein said leading edge member is fixed and said third compartment is located substantially above said bottom surface of said airfoil and said third compartment communicates with the outside.

10. The leading edge member of an airfoil according to claim 9, further comprising:
    a substantially C-shaped spar fixed to the inside of said leading edge member, said C-shaped spar forming said first compartment, second compartment and third compartment, and having first hot air passages between said first compartment and said second compartment and second hot air passages between said second compartment and said third compartment, and
    sections fixed to said C-shaped spar, to said top surface and to said bottom surface of said leading edge member.

11. The leading edge member of an airfoil according to claim 10, wherein said first and second passages are respectively established by first and second embossing on said C-shaped spar.

12. An airfoil of an aircraft, comprising a leading edge member having an outside wall, a first compartment along said outside wall and a de-icing device for circulating hot air in a longitudinal direction of a span of said airfoil, said de-icing device including a hot air distribution duct extending inside said first compartment in said longitudinal direction of said span and spaced from said outside wall, said duct having two open ends defining a length of said duct with a plurality of orifices distributed over at least a part of said length between said two ends, and a hot air supply duct communicating with one of said ends of said distribution duct for flowing hot air longitudinally through said distribution duct and along said first compartment, said hot air supply duct connected to at least one propulsion engine of said aircraft.

13. An aircraft comprising an airfoil having a leading edge member having an outside wall, a first compartment along said outside wall and a de-icing device for circulating hot air in a longitudinal direction of a span of said airfoil, said de-icing device including a hot air distribution duct extending inside said first compartment in said longitudinal direction of said span and spaced from said outside wall, said duct having two open ends defining a length of said duct with a plurality of orifices distributed over at least a part of said length between said two ends, and a hot air supply duct communicating with one of said ends of said distribution duct for flowing hot air longitudinally through said distribution duct and said first compartment, said hot air supply duct connected to at least one propulsion engine of said aircraft.

14. The airfoil of an aircraft, according to claim 12, wherein said hot air supply duct includes a hot air injector discharging into an interior at said one end of said distribution duct and defining a passage therewith.

15. The airfoil of an aircraft, according to claim 12, further comprising:
    a second compartment located under a top surface of said leading edge member for de-icing said top surface,
    a third compartment for collecting said hot air, and
    said first and second compartments communicating with each other, and said second and third compartments communicating with each other.

16. The airfoil of an aircraft, according to claim 15, further comprising:
    a substantially C-shaped spar fixed to the inside of said leading edge member, said C-shaped spar forming said first compartment, second compartment and third compartment, and having first hot air passages between said first compartment and said second compartment and second hot air passages between said second compartment and said third compartment, and
    sections fixed to said C-shaped spar, to said top surface and to said bottom surface of said leading edge member.

17. The aircraft according to claim 13, wherein said hot air supply duct includes a hot air injector discharging into an interior at said one end of said distribution duct and defining a passage therewith.

18. The aircraft according to claim 13, further comprising:
    a second compartment located under a top surface of said leading edge member, for de-icing said top surface,
    a third compartment for collecting said hot air, and
    said first and second compartments communicating with each other, and said second and third compartments communicating with each other.

19. The aircraft according to claim 17, wherein said leading edge member is mobile, said hot air supply means include a telescopic tube part, and said third compartment is located substantially between said first compartment and said second compartment.

20. The aircraft according to claim 19, wherein said leading edge member further includes a fourth compartment located substantially between said first compartment and the fixed part of said airfoil and communicating with the outside, and a substantially E-shaped spar fixed to the inside of said leading edge member, said E-shaped spar forming said first compartment, second compartment, third compartment and fourth compartment, and having first hot air passages between the first compartment and the second compartment and second hot air passages between said third compartment and said fourth compartment, an outside section fixed to a top part of said E-shaped spar and to the top surface of said leading edge member, having third hot air passages between said second compartment and said third compartment, and an inside section fixed to a median part of said E-shaped spar and to said outside section and to the top surface of the leading edge member.

* * * * *